US008832583B2

(12) United States Patent
El-Jayousi et al.

(10) Patent No.: US 8,832,583 B2
(45) Date of Patent: Sep. 9, 2014

(54) VISUALIZING ENTRIES IN A CALENDAR USING THE THIRD DIMENSION

(75) Inventors: Mohannad El-Jayousi, L'Ile-Bizard (CA); Rolan Abdukalykov, Montreal (CA); Xuebo Liang, Brossard (CA); Vincent Lavoie, Montreal (CA); Roy Ghorayeb, Montreal (CA); Alain Gauthier, Montreal (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/601,142

(22) Filed: Aug. 31, 2012

(65) Prior Publication Data

US 2014/0068485 A1 Mar. 6, 2014

(51) Int. Cl.
*G06F 3/048* (2013.01)

(52) U.S. Cl.
USPC ........... 715/771; 715/782; 715/963; 715/759; 715/853

(58) Field of Classification Search
CPC ..................................................... G06Q 10/00
See application file for complete search history.

(56) References Cited

U.S. PATENT DOCUMENTS

| 5,745,110 | A | 4/1998 | Ertemalp |
| 6,201,554 | B1 | 3/2001 | Lands |
| 6,380,953 | B1 | 4/2002 | Mizuno |
| 6,674,450 | B1 | 1/2004 | Toub et al. |
| 6,915,490 | B1 * | 7/2005 | Ewing ........................... 715/794 |
| 7,050,056 | B2 | 5/2006 | Meyringer |
| 7,168,045 | B2 | 1/2007 | Fliess et al. |
| 7,340,484 | B2 | 3/2008 | S et al. |
| 7,421,645 | B2 | 9/2008 | Reynar |
| 7,603,381 | B2 | 10/2009 | Burke et al. |
| 7,739,695 | B2 | 6/2010 | Wood et al. |
| 7,908,584 | B2 | 3/2011 | Singh et al. |
| 8,024,666 | B2 * | 9/2011 | Thompson ................... 715/764 |
| 8,191,003 | B2 * | 5/2012 | Brown et al. ................. 715/769 |
| 8,402,480 | B2 * | 3/2013 | Rohwer ........................ 719/328 |
| 2002/0091586 | A1 | 7/2002 | Wakai et al. |
| 2003/0120621 | A1 | 6/2003 | McDaniel et al. |

(Continued)

FOREIGN PATENT DOCUMENTS

| AU | 2011101579 A4 | 2/2012 |
| EP | 1696301 A1 | 8/2006 |

(Continued)

OTHER PUBLICATIONS

Seavus ProjectViewer 4.1, User Manual, 2009—section 3.7 (groups) 3.6 (filters).*

(Continued)

*Primary Examiner* — Matt Kim
*Assistant Examiner* — Mahelet Shiberou
(74) *Attorney, Agent, or Firm* — Kenyon & Kenyon LLP

(57) ABSTRACT

An apparatus and method are described herein that provide for visualizing subsets of grouped business objects in an application for display in a user interface. Business objects are grouped into subsets according to a selected business object attribute value. The business objects are grouped and displayed in a three-dimensional view including a plurality of layers, where each layer represents a subset of the business objects. The application is implemented, for example, as a calendar application. The visual representations associated with the business objects in each subset of data are displayed in each of the layers of the three-dimensional view. A user selectably controls which subset of data to view in the user interface.

20 Claims, 6 Drawing Sheets

(56) References Cited

U.S. PATENT DOCUMENTS

| | | |
|---|---|---|
| 2003/0182210 A1 | 9/2003 | Weitzman et al. |
| 2004/0252134 A1* | 12/2004 | Bhatt et al. .................... 345/619 |
| 2005/0278217 A1 | 12/2005 | Adams et al. |
| 2005/0289202 A1 | 12/2005 | S et al. |
| 2006/0089877 A1 | 4/2006 | Graziano et al. |
| 2006/0206522 A1 | 9/2006 | Austin et al. |
| 2006/0238538 A1 | 10/2006 | Kapler et al. |
| 2007/0064022 A1 | 3/2007 | Silverbrook et al. |
| 2007/0156430 A1* | 7/2007 | Kaetker et al. .................... 705/1 |
| 2007/0199006 A1 | 8/2007 | Mukundan et al. |
| 2007/0211056 A1 | 9/2007 | Chakraborty et al. |
| 2007/0268246 A1 | 11/2007 | Hyatt |
| 2007/0288283 A1* | 12/2007 | Fitzpatrick ........................ 705/8 |
| 2008/0040684 A1 | 2/2008 | Crump |
| 2008/0120129 A1* | 5/2008 | Seubert et al. .................... 705/1 |
| 2008/0163125 A1* | 7/2008 | Gu et al. .................... 715/853 |
| 2008/0178101 A1* | 7/2008 | Rode et al. .................... 715/764 |
| 2008/0178500 A1 | 7/2008 | Teuteberg |
| 2008/0195969 A1* | 8/2008 | Brown et al. .................. 715/802 |
| 2008/0221946 A1* | 9/2008 | Balon .............................. 705/7 |
| 2008/0307323 A1 | 12/2008 | Coffman et al. |
| 2008/0313005 A1 | 12/2008 | Nessland et al. |
| 2008/0320558 A1 | 12/2008 | Imanishi et al. |
| 2009/0076878 A1 | 3/2009 | Woerner et al. |
| 2009/0158173 A1 | 6/2009 | Palahnuk et al. |
| 2009/0174680 A1 | 7/2009 | Anzures et al. |
| 2009/0293074 A1* | 11/2009 | Rohwer ........................ 719/328 |
| 2010/0030783 A1* | 2/2010 | Ho et al. ........................... 707/9 |
| 2010/0099462 A1 | 4/2010 | Baek et al. |
| 2010/0131889 A1* | 5/2010 | Helmolt et al. ............... 715/804 |
| 2010/0251954 A1 | 10/2010 | Yamada |
| 2010/0325582 A1 | 12/2010 | Bansal et al. |
| 2010/0333014 A1 | 12/2010 | Fritzley et al. |
| 2011/0072394 A1 | 3/2011 | Victor |
| 2011/0078016 A1 | 3/2011 | Wagenblatt et al. |
| 2011/0078058 A1 | 3/2011 | Wagenblatt et al. |
| 2011/0078171 A1 | 3/2011 | Wagenblatt et al. |
| 2011/0087708 A1* | 4/2011 | Teichmann et al. ........... 707/803 |
| 2011/0099500 A1 | 4/2011 | Smith et al. |
| 2011/0157005 A1 | 6/2011 | Inoue |
| 2011/0167369 A1 | 7/2011 | van Os |
| 2011/0167382 A1 | 7/2011 | van Os |
| 2011/0179368 A1* | 7/2011 | King et al. .................... 715/769 |
| 2011/0289422 A1 | 11/2011 | Spivack et al. |
| 2011/0298830 A1 | 12/2011 | Lam |
| 2012/0032877 A1 | 2/2012 | Watkins, Jr. et al. |
| 2012/0036485 A1 | 2/2012 | Watkins, Jr. et al. |
| 2012/0079408 A1* | 3/2012 | Rohwer ........................ 715/772 |
| 2012/0105484 A1 | 5/2012 | Cui |
| 2012/0117493 A1* | 5/2012 | Gu et al. ........................ 715/760 |
| 2012/0131496 A1* | 5/2012 | Goossens et al. ............. 715/784 |
| 2012/0198369 A1 | 8/2012 | Sorin et al. |
| 2012/0253869 A1 | 10/2012 | Ansley |
| 2012/0304121 A1 | 11/2012 | Cahill et al. |
| 2013/0038625 A1* | 2/2013 | Nakajima ...................... 345/611 |
| 2013/0085961 A1* | 4/2013 | Naghshin et al. ............. 705/348 |
| 2013/0144880 A1* | 6/2013 | Kemmer et al. .............. 707/737 |

FOREIGN PATENT DOCUMENTS

| | | |
|---|---|---|
| EP | 1837736 A2 | 9/2007 |
| EP | 2330470 | 6/2011 |
| JP | 2009050937 A | 3/2009 |

OTHER PUBLICATIONS

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

Burigat et al., "Visualizing references to off-screen content on mobile devices: A comparison of Arrows, Wedge, and Overview + Detail," Interacting With Computers, 2011 Elsevier B.V., pp. 156-166.

IBM TDB and Torres, R.J. "Zooming on Visual Calendar Data," IPCOM Prior Art Database, http://ip.com/IPCOM/000121803, Sep. 1, 1991, 2 pages.

Google: "Android 2.3.4 User's Guide," googleusercontent.com, May 20, 2011, Retrieved on Oct. 10, 2013 from the Internet: URL:http://static.googleusercontent.com/external_content/untrusted_dlcp/www.google.com/en//help/hc/pdfs/mobile/AndroidUsersGuide-2.3.4.pdf.

Anonymous: "Google Calendar—Revision as of 16:55, Apr. 17, 2012," Apr. 17, 2012, pp. 1-7, Gustavus Adolphus College, retrieved from the Internet: URL:https://gustavus.edu/gts/w/index.php?title=Google_Calendar&oldid=24920 [retrieved on Jan. 10, 2014].

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL:http://citeseerx.ist.psu.edu/viewdoc/download?doi=10:1.1.202.6970&rep=rep1&type=pdf), 2001.

* cited by examiner

VISUALIZING ENTRIES IN A CALENDAR USING THE THIRD DIMENSION

BACKGROUND INFORMATION

Business software such as enterprise resource planning software implements business processes by modeling business data as business objects with data exchange between the objects. The business data provided via the business objects can be accessed through mechanisms such as graphical user interfaces, forms, and analytical reports. Traditionally, user interfaces providing access to business objects conveyed limited information about the attributes associated with the business objects. In addition, the information presented by the user interfaces could not be efficiently grouped visually based on the needs of a user.

In particular, the layout of entries in enterprise resource software, such as a calendar application, is often confusing for a user because the user is unable to quickly navigate through the visualized business objects to select a group of entries that the user wishes to focus on, because the information has not been efficiently grouped. Existing layouts are also restrictive in allowing a user to compare subsets of a group of data in the user interface to another subset of data in the user interface.

Thus there remains a need in the art for more effectively grouping data entries in an enterprise resource planning software system that allows for a user to parse through a grouping of a subset of data. There also remains a need in the art to compare subsets of data alongside other subsets of the same group data.

SUMMARY

An apparatus and method are described herein that provide for visualizing subsets of grouped business objects in an application for display in a user interface. Business objects may be grouped into subsets according to a selected business object attribute value. The business objects may be grouped and displayed in a three-dimensional view including a plurality of layers, where each layer represents a subset of the business objects. The application may be implemented, for example, as a calendar application. The visual representations associated with the business objects in each subset of data may be displayed in each of the layers of the three-dimensional view. A user may selectably control which subset of data to view in the user interface.

In particular, the exemplary embodiments and/or exemplary methods are directed to an apparatus and method for visualizing grouped business objects in an application, such as a calendar application. The apparatus and method include a device with a displayable screen, such as a mobile device, with the calendar application displayed on the user interface of the device. The apparatus and method include the application specifying the business object attribute values as a parameter of a grouping function of the application in order to group the business objects based on the business object attribute values. The business objects can be divided into subsets based on business object attribute values. The specified business object attribute values can be saved as a parameter available for subsequent grouping.

The business objects are also assigned visual representations and the visual representations of the business objects are displayed in a plurality of layered charts in the three-dimensional view in the application on the user interface of the device. Each layered chart corresponds to a subset of the business objects that are linked by a common business object attribute value. The layered charts are displayed in a cascaded manner in the three-dimensional view.

A user can selectably control the order of the layered charts in the three-dimensional view and select which layer to display in the user interface. A user can select and drag one of the layered charts to a foreground of the three-dimensional view to change the order of the layered charts. Dragging can be performed through the use of the user's finger on a touch screen, if the device has a touch screen, or through the use of a mouse, a keyboard, a keypad, a trackball, etc.

The layered charts can have a transparent background that enables the visual representations of the business objects in all the layered charts to be displayed concurrently. This allows a user to view the contents of each of the subsets and makes it easier for the user to decide which layered chart to select to display.

The size of the visual representations of the business objects displayed on the user interface may be a function of a selected time interval scale for the application. Each visual representation may also include a detail box providing information about the respective business object.

DETAILED DESCRIPTION

The subject matter will now be described in detail for specific preferred embodiments, it being understood that these embodiments are intended only as illustrative examples and is not to be limited thereto these embodiments.

Embodiments may discuss systems to efficiently group business objects for display in an application in a user interface. Business objects may be grouped into subsets according to a selected business object attribute. The business objects may be grouped and displayed in a three-dimensional view of a plurality of layers, where each layer represents a subset of the business objects. The application may be implemented, for example, as a calendar application. The visual representations associated with the business objects in each subset of data may be displayed in each of the layers of the three-dimensional view. A user may selectably control which subset of data to view in the user interface.

Figure 1:
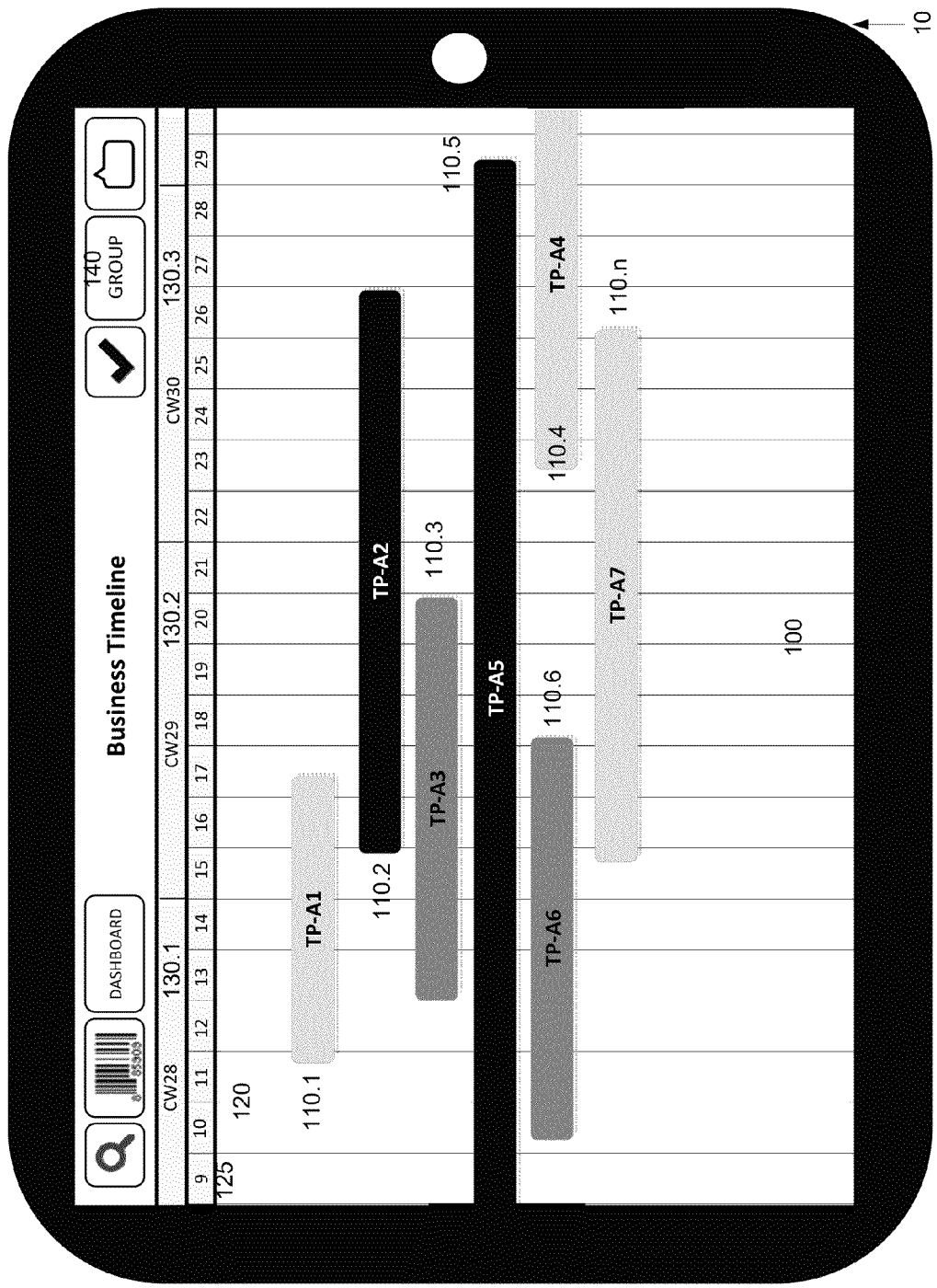
FIG. 1 is a diagram of a graphical user interface that displays business objects on a device according to an embodiment.

FIG. 1 illustrates a graphical user interface 100 that displays business objects on a device 10 according to an embodiment. In an embodiment, device 10 may be a hand-held device, personal digital assistant (PDA), television set-top Internet appliance, mobile telephone, smart phone, tablet, Android™ device, iPod™, iPhone™, iPad™, etc., or as a combination of one or more thereof, or other comparable device. A mobile application, such as for example, a calendar application, may be executed on device 10. This application may be displayed in user interface 100 that is displayed on a screen of the device 10.

Visual representations associated with business objects representing underlying data entries may be displayed on the user interface 100 as visual bars. Each visual bar may present information about a corresponding business object in a corresponding detail box. In the example embodiment of FIG. 1, visual bars 110.1-110.n may be displayed on user interface 100. The number of visual bars may correspond to the number of business objects, as each visual bar may map to a specific business object of the business enterprise software.

The information in visual bars 110.1-110.n may represent business objects of the business enterprise software. The business objects being displayed in visual bars 110.1-110.n may represent a modeling of a particular business process. In an example embodiment, the visual bars 110.1-110.n may correspond to information related to products, business promotions, sales orders, sales quotes, customer quotes, service documents, business opportunities, etc. Each of the business objects represented by a corresponding visual bar may include attributes which define metadata associated with the business object. Attributes may include, for example, a specified time period, a specified product, customer information, product information, etc. In an example embodiment where the business object corresponds to a business promotion, attributes of the business object may include the promotion period of the promotion, including a start and end date, the companies offering the promotion and the companies being offered the promotion, and the product for which the promotion applies, including information pertaining to the product.

The attributes of business objects displayed user interface 100 may indicate a range of values. For example, in an embodiment where the business objects correspond to business promotions, each of the business objects in visual bars 110.1-110.n may include one or more attributes indicating the time period for which the business promotion is valid. The time period may be implemented by either defining a single time period attribute associated with the business object or by defining a start date attribute and an end date attribute associated with the business object. In an alternate embodiment, the business object may include one or more attributes indicating a range of quantities to which the business promotion applies to.

The size of the visual bars 110.1-110.n in user interface 100 may be increased or decreased relative based on a selection by a user of the displayed time interval scales of the calendar application. In an embodiment, multiple displayed time interval ranges 125 and 130.1-130.2 may be displayed in user interface 100. The displayed time intervals may represent a range of values associated with at least one business object attribute. The visual bars may be positioned in the calendar application relative to the size of the displayed time intervals of the horizontal axis. In an embodiment, a first selection for a time interval scale may be made for displayed range 125. In the example embodiment in FIG. 1, range 125 may be selected to correspond to a daily time period. In this embodiment, the entries in time range 125 may correspond to subsequent days in the overall business timeline of the application. In alternate embodiments, the time interval scale for range 125 may be selected to correspond to a weekly, monthly, bi-monthly, quarterly, bi-annually, or annual scale.

Similarly, a selection may be made for the time interval scale for displayed range 130. In the example embodiment in FIG. 1, range 130 may be selected to correspond to a weekly time period. In this embodiment, the entries in time range 130 may correspond to subsequent weeks in the overall business timeline of the application. Each entry 130.1-130.3 in range 130 may map to a subset of range 125. For example, in the example embodiment of FIG. 1, days 15 to 21 in range 125 may correspond to calendar week 29 of entry 130.2. In alternate embodiments, the time interval scale for range 130 may be selected to correspond to a monthly, bi-monthly, quarterly, bi-annually, annual, or period of multiple years.

The size of visual bars 110.1-110.n may change dependent on the selection of the time interval scales for ranges 125 and 130. In an embodiment where range 125 is selected to correspond to a daily time period, visual bars 110.1-110.n may increase in size. In an embodiment where range 125 is selected to correspond to a weekly, monthly, bi-monthly, quarterly, bi-annually, or annual scale, the size of visual bars 110.1-110.n may decrease. The size of visual bars 110.1-110.n may decrease as larger time periods are selected.

The visual bars 110.1-110.n visualized in the user interface may be positioned relative to the displayed time intervals. The business objects associated with each visual representation and specific detail box may include business object attribute values in common with other business objects visually that are also visualized in the user interface 100. User interface 100 may include a button 140 which may allow for grouping of the business objects based on business object attributes.

Figure 2:
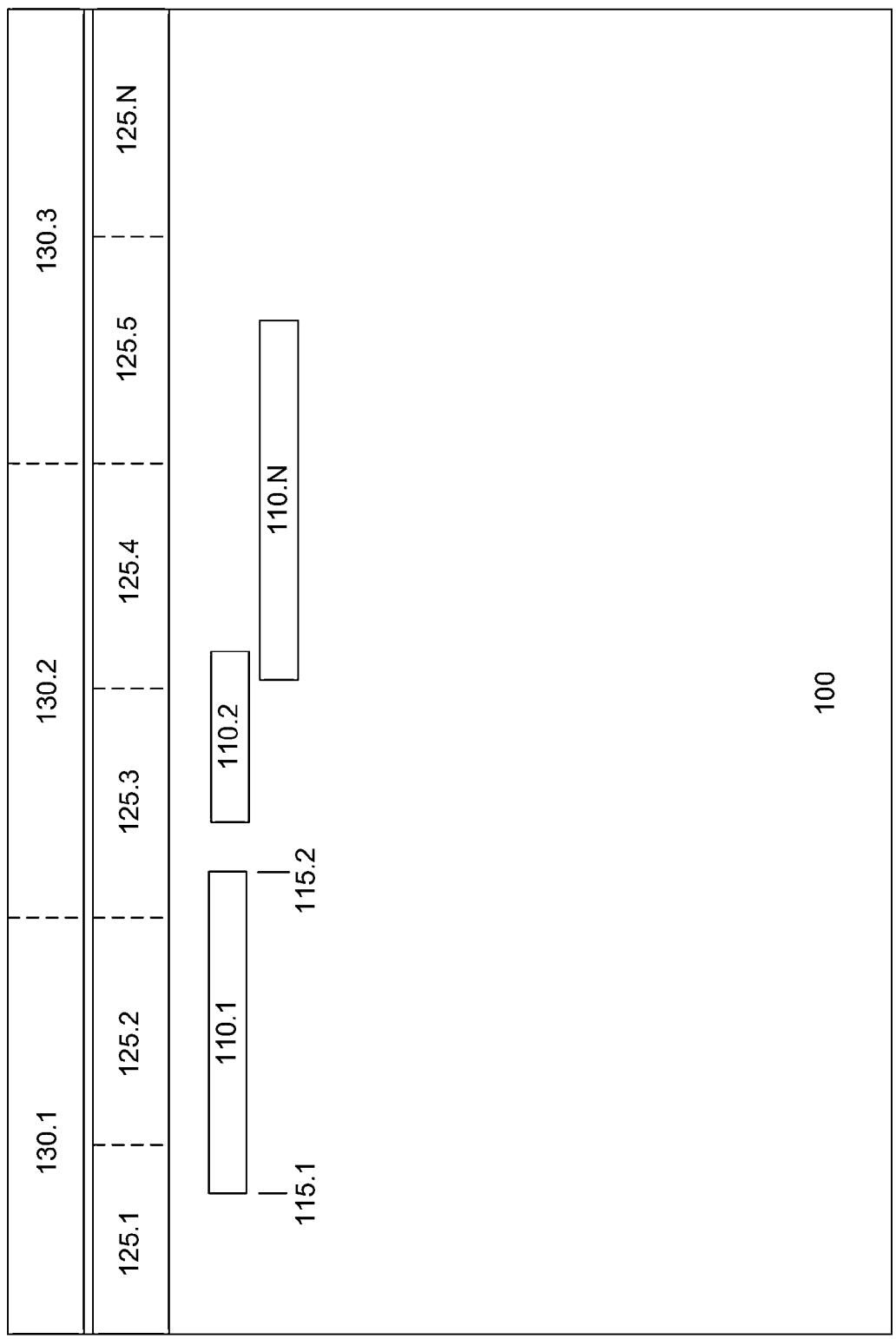
FIG. 2 is a diagram of the detailed layout of the user interface displaying the business objects according to an embodiment.

FIG. 2 further illustrates the layout of the user interface 100 displaying the business objects according to an embodiment. In an embodiment, the business objects may be displayed on user interface 100 in an organized manner to visually convey information about the business objects. The business objects may be displayed in visual bars 110.1-110.n on the user interface 100.

Visual bars 110.1-110.n may be visually displayed on the user interface 100 based on the selection of the display time intervals scales for ranges 125 and 130. In an example embodiment, displayed time ranges 125 and 130 may represent time periods. Displayed time range 125 may be divided into units 125.1-125.n that may correspond to a specified time period, such as, for example, a daily time period. In other embodiments, time range 125 may be divided into time periods based on a monthly, quarterly, or annual basis. Displayed time range 130 may be divided into units 130.1, 130.2, and 130.3, as in the example embodiment of FIG. 2, that may correspond to a specified time period. The time period for range 130 may correspond to a range that is bigger than the selected time period for range 125. For example, if range 125 is divided into daily time periods, range 130 may be selected to correspond to monthly time periods. In an alternate embodiment where the selected time intervals for range 130 has been selected to be calendar years, the intervals for range 125 may be selected, for example, to correspond to business quarters. In an alternate embodiment, the intervals for range 125 may be calculated by the calendar application based on the displayed data.

In the example embodiment in FIG. 2, range 125 may be displayed in the user interface 100 above the visual bars. Range 130 may be displayed directly above range 125 in the user interface 100.

In an embodiment, the visual bars 110.1-110.n displayed on the user interface 100 may be positioned and presented based on respective attribute values of the business objects relative to the selected time interval scales of ranges 125 and 130. Each visual bar 110.1-110.n may include attributes indicating, for example, the business promotion period of the respective business promotion business object. The visual bars 110.1-110.n may be presented to visually convey the span of the business promotion periods, and the start/end of the business promotion periods. In an embodiment, each of the visual bars 110.1-110.n may include a start date 115.1 and an end date 115.2 where the visual bar begins and ends in the user interface 100. In an embodiment where a user may zoom or pan in the calendar application, the start date 115.1 and/or the end date 115.2 may not be displayed in user interface 100. In an example embodiment where the business objects correspond to a business promotion, start date 115.1 may correspond to the start of a promotion. Conversely, end date 115.2 may correspond to the end of a promotion.

The size of the visual bars 110.1-110.n as displayed in user interface 100 may depend on the selected time intervals in ranges 125 and 130. As the time intervals scales of the ranges 125 and 130 are selectively increased or decreased by a user, the size of the visual bars may change based on the selection.

User interface 100 may also display visual bars that correspond to other time periods in ranges 125 and 130. For example, user interface 100 may display business promotions in a current year, with the visual representation displayed in interface 100 determined by selection of ranges 125 and 130. A user may however, desire to view previous promotions in a previous year, for example, or future promotions in a subsequent year. In an example embodiment, a user may scroll to a previous time period to view previous promotions by scrolling to the left using his or her finger where device 10 has a touch screen, or a mouse, a keyboard, a keypad, a trackball, etc., for other devices. The displayed time interval units 125.1-125.n may display new time periods corresponding to the previously selected year, incremented by the selected time interval scale for range 125. Displayed time interval units 130.1-130.3 may also display new time periods corresponding to the previously selected year, incremented by the selected time interval scale for range 130.

In an alternate embodiment, a user may scroll to a future time period to view any planned future business promotions. The user may scroll to the right by using his or her finger where device 10 has a touch screen, or a mouse, a keyboard, a keypad, a trackball, etc., for other devices. The displayed time interval units 125.1-125.n may display new time periods corresponding to the future time period, incremented by the selected time interval scale for range 125. Displayed time interval units 130.1-130.3 may also display new time periods corresponding to the future time period, incremented by the selected time interval scale for range 130.

Figure 3:
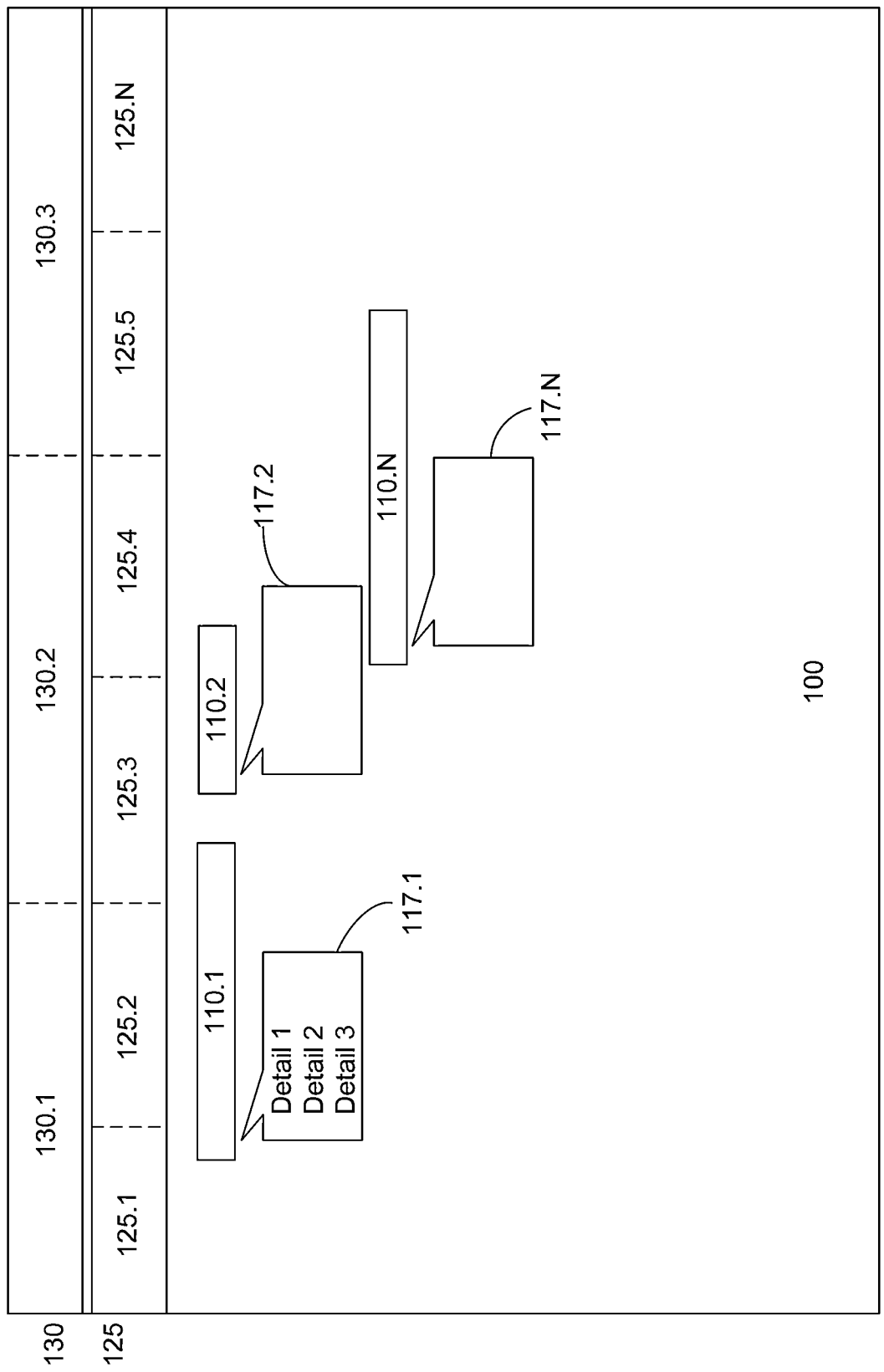
FIG. 3 is a diagram of the user interface displaying the business objects alongside detail boxes containing business object attribute information according to an embodiment.

FIG. 3 illustrates user interface 100 displaying the business objects alongside detail boxes containing business object attribute information according to an embodiment. In an embodiment, the business objects may be displayed on user interface 100 in an organized manner to visually convey information about the business objects. The business objects may be displayed in visual bars 110.1-110.n on the user interface 100.

Visual bars 110.1-110.n may be visually displayed on the user interface 100 based on the selection of the display time intervals scales for ranges 125 and 130 which may be divided into units 125.1-125.n and 130.1-130.3 that correspond to a specified time period. As in the example embodiment in FIG. 2, visual bars 110.1-110.n displayed on the user interface 100 may be positioned and presented based on respective attribute values of the business objects relative to the selected time interval scales of ranges 125 and 130, with the size of the visual bars dependent on the selected time intervals.

Each visual bar 110.1-110.n may include attributes indicating, for example, the business promotion period of the respective business promotion business object. Details about the business object attributes may be displayed in detail boxes 117.1-117.n. In the example embodiment of FIG. 3, detail box 117.1 may correspond to information about the business object attributes in visual bar 110.1. Similarly, detail box 117.2 may correspond to information about the business object attributes in visual bar 110.2, and detail box 117.n may correspond to information about the business object attributes in visual bar 110.n. In an embodiment, the number of detail boxes displayed in user interface 100 may be equal to the number of visual bars displayed in user interface 100. The number of detail boxes may also correspond to the number of business objects.

In an embodiment, the detail boxes 117.1-117.n may be displayed in the user interface 100 only after an action has been performed on a specific visual bar 110.1-110.n. An action performed may include, for example, clicking on a respective visual bar with a mouse, trackball, keypad, or keyboard, etc., or touching a visual bar 110.1-110.n in a device 10 which has a touch screen. In this embodiment, each detail box 117.1-117.n may only be displayed after the corresponding visual bar is displayed. For example, in this embodiment, detail box 117.1 may only be displayed if a user selects visual bar 110.1. Similarly, detail box 117.2 may only be displayed if a user selects visual bar 110.2. All remaining detail boxes, including 117.n, may only be displayed, if the remaining visual bars, including 110.n, are individually selected.

In an alternate embodiment, detail boxes 117.1-117.n may be displayed even if no actions were performed on the respective visual bars. In this alternate embodiment, all detail boxes 117.1-117.n may be displayed without the need for a user to perform any actions on visual bars 110.1-110.n by clicking or selecting the respective visual bar. The settings of the application may be configured to enable the display of the detail boxes respectively concurrently with the visual bars without the need to individually select the visual bars. The application may also be configured to disable the display of the detail boxes. In an embodiment where the detail boxes 117.1-117.n are displayed concurrently with visual bars 110.1-110.n, disabling the display of the detail boxes may remove the detail boxes 117.1-117.n from the user interface 100.

A user may selectively scroll through the application to view the visual bars and corresponding detail boxes for past and future time periods. This may accomplished by scrolling left or right with a user's finger on a touch screen, or scrolling left or right on a mouse, trackball, keypad, keyboard, etc. In an example embodiment, a user may scroll to a previous time period to view previous promotions by scrolling to the left using his or her finger where device 10 has a touch screen, or a mouse, keyboard, keypad, trackball, etc., for other devices. The displayed time interval units 125.1-125.n may display new time periods corresponding to the previously selected year, incremented by the selected time interval scale for range 125. Displayed time interval units 130.1-130.3 may also display new time periods corresponding to the previously selected year, incremented by the selected time interval scale for range 130. User interface 100 may display the corresponding visual bars and detail boxes for business entities hat occurred in a selectively viewed previous time period.

A user may also selectively scroll through the application to view future time periods. The user may scroll to the right by using his or her finger where device 10 has a touch screen, or a mouse, keyboard, keypad, trackball, etc., for other devices. The displayed time interval units 125.1-125.n may display new time periods corresponding to the future selected time period, incremented by the selected time interval scale for range 125. Displayed time interval units 130.1-130.3 may also display new time periods corresponding to the future selected time period, incremented by the selected time interval scale for range 130. User interface 100 may display the corresponding visual bars and detail boxes for promotions that occurred in a selectively viewed future time period.

A user may select button 140 to enable grouping of the business objects displayed in visual bars 110.1-110.n. The activation of the grouping function 140 in the calendar application may include specifying business object attribute values as a parameter of the grouping function to group the business objects based on business object attribute value. The specified business object attribute value may be saved as a parameter available for subsequent grouping function activations.

Figure 4:
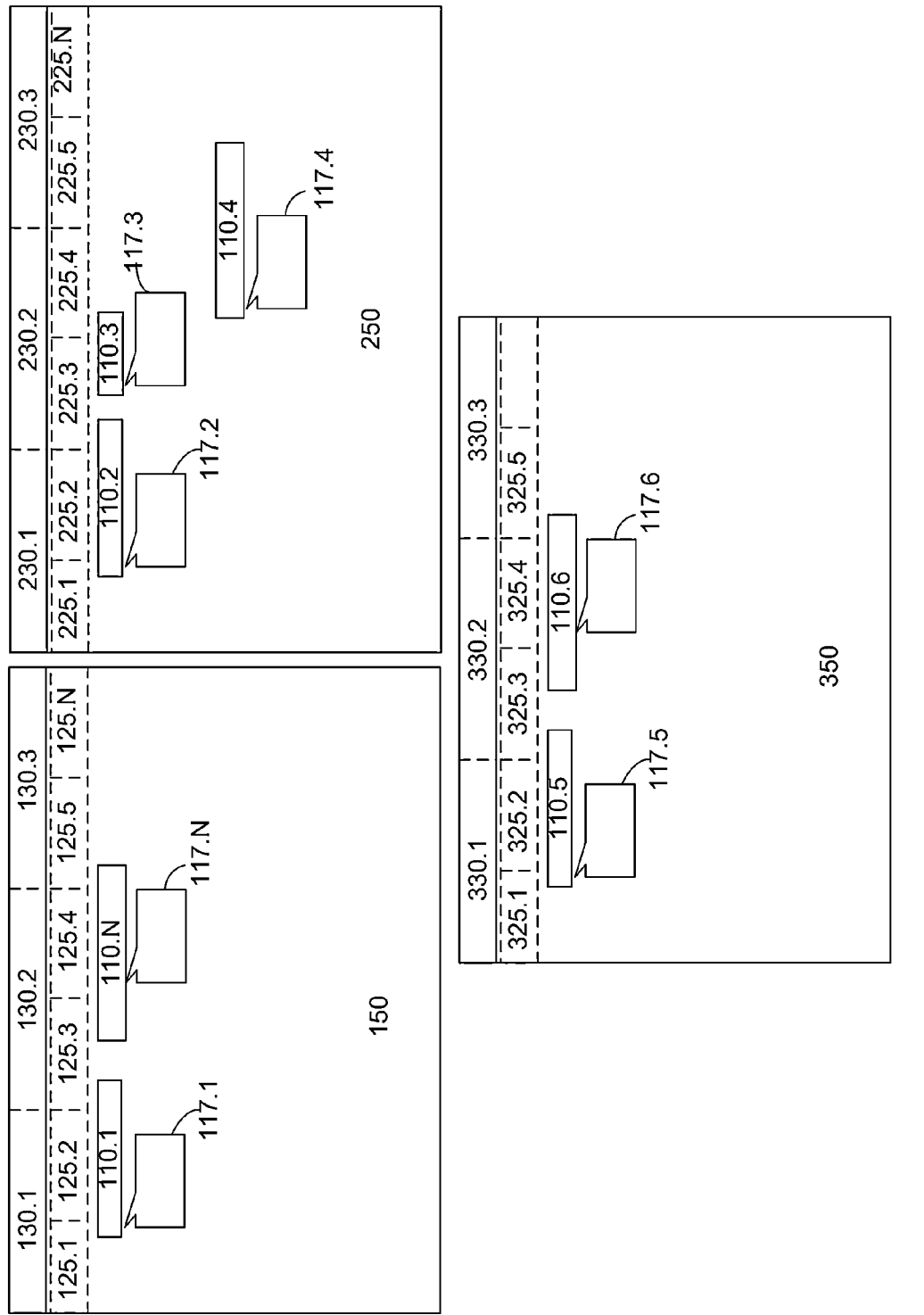
FIG. 4 is a diagram of the user interface displaying different layered charts containing separate groupings of business objects according to an embodiment.

Visual bars 110.1-110.n may be grouped in user interface 100 based on common attributes or metadata of the respective underlying business objects. These groupings of visual bars may be separately presented in different charts in interface 100, as depicted in FIG. 4. User interface 100 may include layers charts for display, with each chart corresponding to a different subset of business objects.

FIG. 4 illustrates user interface 100 displaying different layered charts containing separate groupings of business objects. The selection of the grouping function may divide the business objects and their visual bars 110.1-110.n into different subsets of the initial data set. These subsets may be displayed as different charts, depicted by charts 150, 250, and 350 in FIG. 4. In the example embodiment of FIG. 4, there may be three charts, corresponding to a grouping of the visual bars 110.1-110.n into three subsets. It should be understood that the grouping function is not restricted to dividing the business objects and respective visual bars to a specific number of subsets.

In an example embodiment, visual bars 110.1-110.n may be correspond to business promotion business objects. The business promotion business objects may include attributes or metadata indicating the products or services associated with the respective business promotions. The grouping function of the application may be activated to group visual bars 110.1-110.n based on the products associated with the respective underlying business promotion business objects.

In the example embodiment of FIG. 4, visual bars 110.1-110.n may be grouped into separate charts based on the respective business objects having the same business object attribute value. In FIG. 4, chart 150 may represent a first grouping of the business objects for visual bars 110.1-110.n. Visual bars 110.1 and 110.n may be grouped together in the first chart 150 based on a common business object attribute value. Detail boxes 117.1 and 117.n corresponding to the displayed visual bars in chart 150 may also be displayed in chart 150 next to its respective visual bar. Detail box 117.1 may be displayed to provide information of the business object attributes of visual bar 110.1. Detail box 117.n may be displayed to provide information of the business object attributes of visual bar 110.n. The time interval scales for chart 150 may be set by the selection of ranges 125 and 130 and the time selection period units 125.1-125.n and 130.1-130.3.

Chart 250 may visually display visual bars corresponding to business objects in a second subset or grouping of all the business objects. In the example embodiment in FIG. 4, visual bars 110.2, 110.3, and 110.4 may be grouped together in the second chart 250 based on same business object attribute value. Detail boxes 117.2, 117.3, and 117.4 corresponding to the displayed visual bars in chart 250 may also be displayed in chart 250 next to the respective visual bar. Detail box 117.2 may be displayed to provide information of the business object attributes of visual bar 110.2. Detail box 117.3 may be displayed to provide information of the business object attributes of visual bar 110.3. Detail box 117.4 may be displayed to provide information of the business object attributes of visual bar 110.4. The time interval scales for chart 250 may be set for the time selection period units 225.1-225.n and 230.1-230.3. In an embodiment, the time interval scales for chart 250 may be the same as the time interval scales for chart 150 and time selection period units 225.1-225.n and 230.1-230.3 may correspond to the same time period as units 125.1-125.n and 130.1-130.3.

Chart 350 may visually display visual bars corresponding to business objects in a third subset or grouping of the business objects. In the example embodiment in FIG. 4, visual bars 110.5 and 110.6 may be grouped together in the third chart 350 based on the same business object attribute value. Detail boxes 117.5 and 117.6 corresponding to the displayed visual bars in chart 350 may also be displayed in chart 350 next to the respective visual bar. Detail box 117.5 may be displayed to provide information of the business object attributes of visual bar 110.5. Detail box 117.6 may be displayed to provide information of the business object attributes of visual bar 110.6. The time interval scales for chart 350 may be set for the time selection period units 325.1-325.n and 330.1-330.3. In an embodiment, the time interval scales for chart 350 may be the same as the time interval scales for charts 150 and 250, and time selection period units 325.1-325.n and 330.1-330.3 may correspond to the same time period as units 125.1-125.n, 225.1-225.n, 130.1-130.3, and 230.1-230.3.

In an embodiment, grouping parameter values used for one or more groupings for charts 150, 250, and 350 may be saved for future groupings. The grouping parameter values may then be saved so that a user can perform the same grouping in the future without having to manually specify the parameter again. In an alternate embodiment, grouping parameter values may be provided as presets for grouping by the application.

In an embodiment, grouping may be done based on products associated with the respective business objects. Each of the charts 150, 250, and 350 may contain a subset of business objects and their respective visual bars for display, that include a specific product associated to it. In another embodiment, grouping may be done based on, for example, a status of each of the business objects. Each of the charts 150, 250, and 350 may contain a subset of business objects and their respective visual bars for display, that all have the same status.

A business object and its respective visual bar may appear on more than one chart and is not restricted to appearing on only one chart. For example, in an example embodiment, a particular business object and visual bar correspond to multiple products, including Product A and Product B among others. If a grouping of the business objects is done based on specific products, and chart 150 displays visual bars representing business objects associated with Product A, chart 250 displays visual bars representing business objects associated with Product B, and chart 350 displays visual bars representing business objects associated with Product C, the visual bar of the particular business object may be displayed on both charts 150 and 250.

Figure 5:
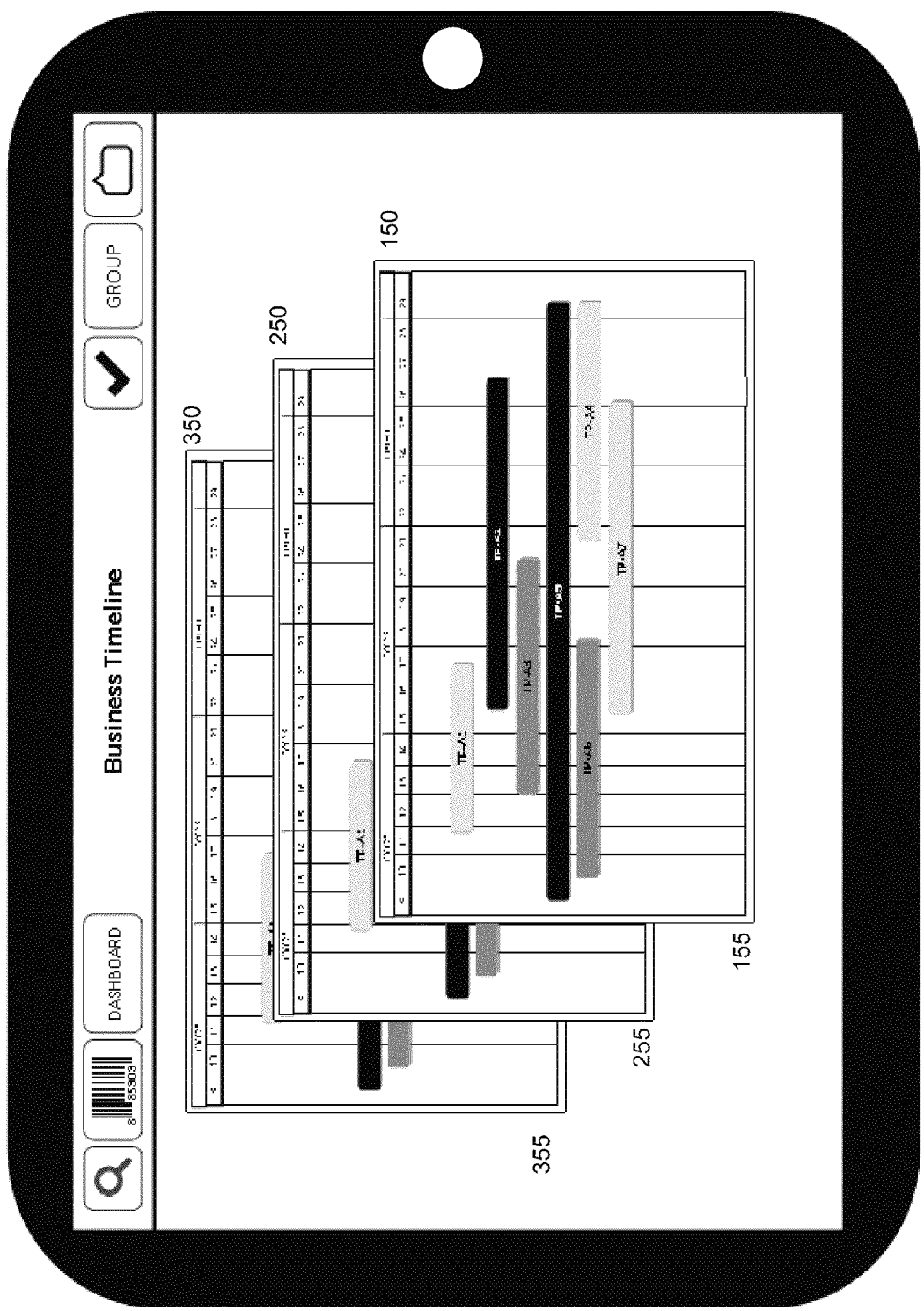
FIG. 5 is a diagram of a three-dimensional display of the grouped subsets of business objects displayed in cascaded layers in the user interface according to an embodiment.

Charts 150, 250, and 350, which may include a subset of the business objects after the grouping function is performed, may be displayed to a user as layers, as depicted in FIG. 5. FIG. 5 illustrates a three-dimensional display of the grouped subsets of business objects displayed in cascaded layers in the user interface 100. In the example embodiment of FIG. 5, the layered charts may be cascaded, with each of the layered charts being drawn with an opaque background, where each of the layered charts completely overlaps the previous layer. In the example embodiment of FIG. 5, chart 150 may be displayed as a first layer in front of chart 250 which may be displayed as a second layer. Chart 250 may be displayed as a second layer that is cascaded in front of chart 350, but is hidden by chart 150.

The value of the common business object attribute for the groupings of the business objects in charts 150, 250, and 350 may be displayed next to the respective chart. For example, field 155 may represent a text or visual component depicting the shared business object attribute value shared by business objects displayed in the visual bars in chart 150. Field 155 may be displayed directly adjacent to the layered chart 150. In an example embodiment where grouping is performed on the business objects based on products, field 155 may display, for example, the product value shared by each of the business objects visually represented in chart 150. In an example embodiment where grouping is performed on the business objects based on status, field 155 may display, for example, the actual status shared by each of the business objects visually represented in chart 150.

Field 255 may represent a text or visual component depicting the shared business object attribute value shared by business objects displayed in the visual bars in second layered chart 250. Field 255 may be displayed directly adjacent to the layered chart 250. In an example embodiment where grouping is performed on the business objects based on products, field 255 may display, for example, the product value shared by each of the business objects visually represented in chart 250. In an example embodiment where grouping is performed on the business objects based on status, field 255 may display, for example, the actual status shared by each of the business objects visually represented in chart 250.

Field 355 may represent a text or visual component depicting the shared business object attribute value shared by business objects displayed in the visual bars in third layered chart 350. Field 355 may be displayed directly adjacent to the layered chart 350. In an example embodiment where grouping is performed on the business objects based on products, field 355 may display, for example, the product value shared by each of the business objects visually represented in chart 350. In an example embodiment where grouping is performed on the business objects based on status, field 355 may display, for example, the actual status shared by each of the business objects visually represented in chart 350.

In an embodiment, a user may selectively choose one of the layered charts for display in interface 100. In an embodiment, a selected chart may be displayed in the entire window of user interface 100, as depicted in FIG. 1. Selection of one of the cascaded layered charts may be made from the three-dimensional grouping, depicted in FIG. 5. A user may selectably control a cascaded layered chart to bring the layered chart to the foreground. In embodiments where device 10 has a touch screen, this may be accomplished by a gesture, such as the use of a user's finger, where, for example, a subsequent layer such as chart 250 or 350, is dragged to the front, or where the subsequent layer is simply selected by the finger. In embodiments where a mouse, keyboard, keypad, trackball, etc. are used, for example, a subsequent layer may be clicked on and/or selected and dragged using the hardware component to the foreground.

The selection of one of the cascaded layered charts in the three-dimensional view may change the order of the layered charts. For example, in an example embodiment where a user may select chart 250, chart 250 may be brought to the foreground and appear to be the first layer in the three-dimensional cascade. Chart 350 may "move" behind chart 250, where it may subsequently appear to be the second layer in the three-dimensional cascade. Chart 150 may "move" behind chart 350 for display, where it may appear to be the third layer in the three-dimensional case.

In an embodiment where a user may select chart 350, chart 350 may be brought to the foreground and appear to be the first layer in the three-dimensional cascade. Chart 150 may "move" behind chart 350, where it may subsequently appear to be the second layer in the three-dimensional cascade. Chart 250 may "move" behind chart 150 for display, where it may appear to be the third layer in the three-dimensional case.

Figure 6:
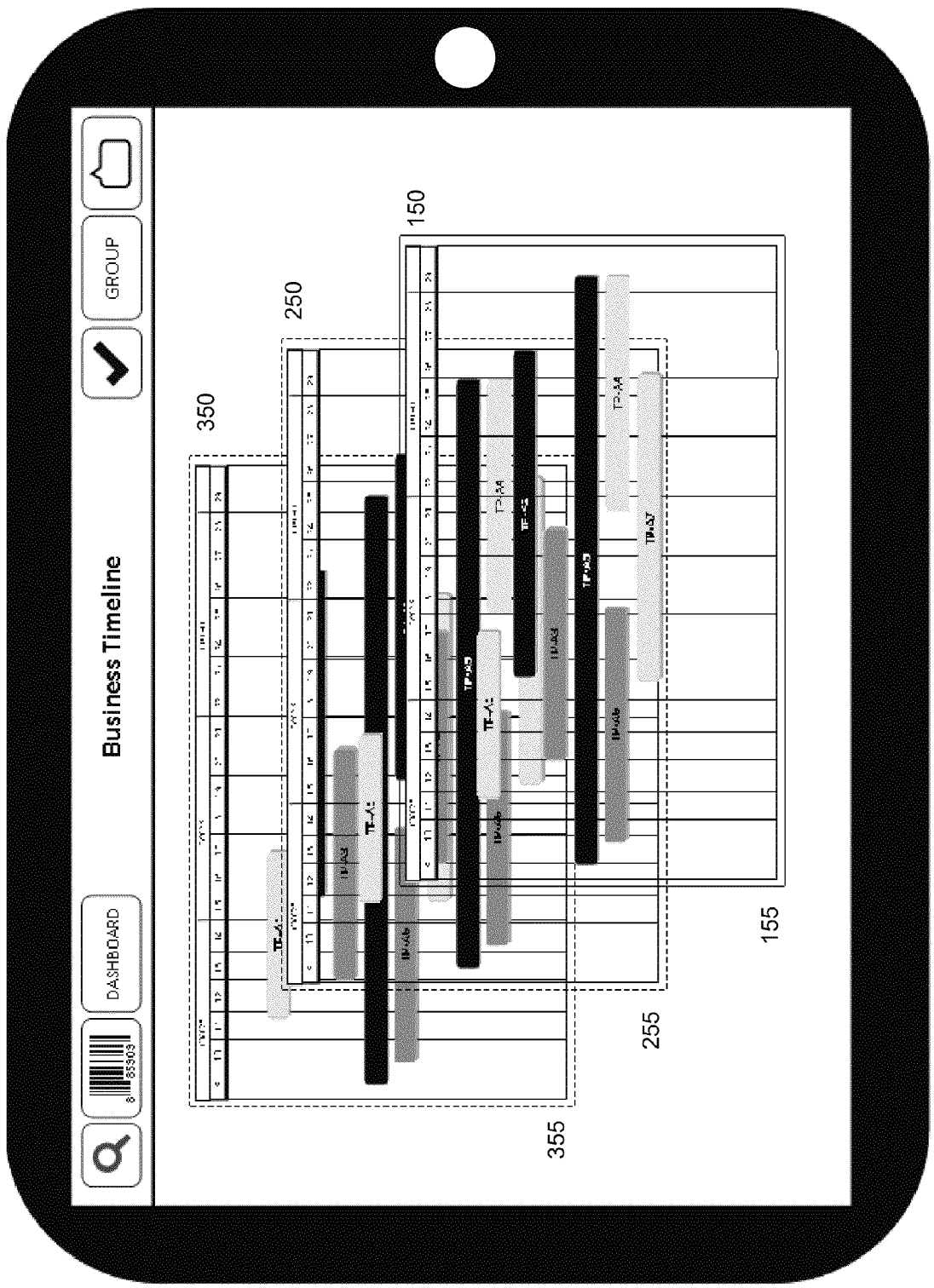
FIG. 6 is a diagram of a three-dimensional display of the grouped subsets of business objects displayed in transparent cascaded layers in the user interface according to an embodiment.

The layers of the three-dimensional cascade may also be viewed with a transparent background. FIG. 6 illustrates a three-dimensional display of the grouped subsets of business objects displayed in transparent cascaded layers in the user interface 100. In the example embodiment of FIG. 6, the layered charts may be cascaded, with each of the layered charts being drawn with a transparent background, where each of the layered charts may still be viewed behind any overlapping layered chart. In the example embodiment of FIG. 6, chart 150 may be displayed as a first layer in front of chart 250 which may be displayed as a second layer. Chart 250 may be displayed as a second layer that is cascaded in front of chart 350, but may be hidden by chart 150.

The value of the common business object attribute for the groupings of the business objects in charts 150, 250, and 350 may be displayed next to the respective chart in FIG. 6. For example, field 155 may represent a text or visual component depicting the shared business object attribute value shared by business objects displayed in the visual bars in chart 150. Field 155 may be displayed directly adjacent to the layered chart 150. In an example embodiment where grouping is performed on the business objects based on products, field 155 may display, for example, the product value shared by each of the business objects visually represented in chart 150. In an example embodiment where grouping is performed on the business objects based on status, field 155 may display, for example, the actual status shared by each of the business objects visually represented in chart 150.

Field 255 may represent a text or visual component depicting the shared business object attribute value shared by business objects displayed in the visual bars in second layered chart 250. Field 255 may be displayed directly adjacent to the layered chart 250. In an example embodiment where grouping is performed on the business objects based on products, field 255 may display, for example, the product value shared by each of the business objects visually represented in chart 250. In an example embodiment where grouping is performed on the business objects based on status, field 255 may display, for example, the actual status shared by each of the business objects visually represented in chart 250.

Field 355 may represent a text or visual component depicting the shared business object attribute value shared by business objects displayed in the visual bars in third layered chart 350. Field 355 may be displayed directly adjacent to the layered chart 350. In an example embodiment where grouping is performed on the business objects based on products, field 355 may display, for example, the product value shared by each of the business objects visually represented in chart 350. In an example embodiment where grouping is performed on the business objects based on status, field 355 may display, for example, the actual status shared by each of the business objects visually represented in chart 350.

In an embodiment, a user may selectively choose one of the layered charts for display in interface 100. In an embodiment, a selected chart may be displayed in the entire window of user interface 100, as depicted in FIG. 1. Selection of one of the cascaded layered charts may be made from the three-dimensional grouping, depicted in FIG. 6. The transparent background of the charts may allow for a user to see the contents of the groupings before selecting a specific layered chart. A user may selectably control a cascaded layered chart to bring the layered chart to the foreground. In embodiments where device 10 has a touch screen, this may be accomplished by a gesture, such as the user of a user's finger, where, for example, a subsequent layer such as chart 250 or 350, is dragged to the front, or where the subsequent layer is simply selected by the finger. In embodiments where a mouse, keyboard, keypad, trackball, etc. are used, for example, a subsequent layer may be clicked on and/or selected and dragged using the hardware component to the foreground.

The selection of one of the cascaded layered charts in the three-dimensional view may change the order of the layered charts. For example, in an example embodiment where a user may select chart 250, chart 250 may be brought to the foreground and appear to be the first layer in the three-dimensional cascade. Chart 350 may "move" behind chart 250, where it may subsequently appear to be the second layer in the three-dimensional cascade. Chart 150 may "move" behind chart 350 for display, where it may appear to be the third layer in the three-dimensional case.

In an embodiment where a user may select chart 350, chart 350 may be brought to the foreground and appear to be the first layer in the three-dimensional cascade. Chart 150 may "move" behind chart 350, where it may subsequently appear to be the second layer in the three-dimensional cascade. Chart 250 may "move" behind chart 150 for display, where it may appear to be the third layer in the three-dimensional case.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for visualizing grouped business objects in an application, the method comprising:
   grouping a plurality of business objects into subsets based on business object attribute values, wherein each subset is associated with a respective distinct business object attribute value and the each subset includes business objects from the plurality of business objects with the same respective business attribute value;
   assigning the business objects in each subset to visual representations;
   displaying the visual representations of the business objects in a plurality of layered charts, each layered chart corresponding to the each subset, the each layered chart including business objects from the corresponding each subset, wherein the layered charts are cascaded in a three-dimensional view; and
   based on a user's selection, displaying a selected layer in a user interface.

2. The method according to claim 1, wherein the application is a calendar application.

3. The method according to claim 1, wherein a user interface grouping button selectively controls the grouping of business objects into subsets.

4. The method according to claim 1, further comprising:
   specifying the business object attribute values as a parameter of a grouping function to group the plurality of business objects based on the business object attribute values.

5. The method according to claim 1, wherein an order of the layered charts is selectably controlled.

6. The method according to claim 1, wherein a size of the visual representations is a function of a selected time interval scale for the application.

7. The method according to claim 1, wherein each visual representation includes a detail box providing information about the respective business object.

8. The method according to claim 4, wherein the specified business object attribute values are saved as a parameter available for subsequent grouping.

9. The method according to claim 5, wherein a user selects and drags one of the layered charts to a foreground of the three-dimensional view to change the order of the layered charts.

10. The method according to claim 9, wherein the dragging is performed by the user's finger on a touch screen.

11. The method according to claim 9, wherein the dragging is performed by at least one of a mouse, a keyboard, a keypad, and a trackball.

12. A device comprising:
   a processor to:
      group a plurality of business objects into subsets based on business object attribute values, wherein each subset is associated with a respective distinct business object attribute value and the each subset includes business objects from the plurality of business objects with the same respective business attribute value;
      assign the business objects in each subset to visual representations;
      display the visual representations of the business objects in a plurality of layered charts, each layered chart corresponding to the each subset, the each layered chart including business objects from the corresponding each subset, wherein the layered charts are cascaded in a three-dimensional view;

receive a user selection of a selected layer for display; and display the selected layer in a user interface.

13. The device according to claim 12, wherein the application is a calendar application.

14. The device according to claim 12, wherein a user interface grouping button selectively controls the grouping of business objects into subsets.

15. The device according to claim 12, wherein the business object attribute values are specified as a parameter of a grouping function to group the plurality of business objects based on the business object attribute values.

16. The device according to claim 12, wherein an order of the layered charts is selectably controlled.

17. The device accord to claim 15, wherein the specified business object attribute values are saved as a parameter available for subsequent grouping.

18. The device according to claim 16, wherein a user selects and drags one of the layered charts to a foreground of the three-dimensional view to change the order of the layered charts.

19. The device according to claim 18, wherein the dragging is performed by at least one of the user's finger on a touch screen, a mouse, a keyboard, a keypad, and a trackball.

20. An apparatus for visualizing grouped business objects, the apparatus comprising:

a mobile device having a touch screen; and an application displayed on a user interface of the mobile device, the application being executed to:

specify business object attribute values of the business objects as a parameter of a grouping function to group the business objects based on the business object attribute values;

group the business objects into subsets based on the specified business object attribute values, wherein each subset is associated with a respective distinct business object attribute value and the each subset includes business objects from the plurality of business objects with the same respective business attribute value;

assign the business objects in each subset to visual representations;

display the visual representations of the business objects in a plurality of layered charts, each layered chart corresponding to the each subset, the each layered chart including business objects from the corresponding each subset, wherein the layered charts are cascaded in a three-dimensional view;

receive a user selection of a selected layer for display;

display the selected layer in a user interface; and save the specified business object attribute values as a parameter available for subsequent grouping;

wherein a user selects and drags one of the layered charts to a foreground of the three-dimensional view to change the order of the layered charts using the touch screen.

* * * * *